United States Patent
Chung

(10) Patent No.: US 8,339,998 B2
(45) Date of Patent: Dec. 25, 2012

(54) MEETING INFORMATION DISTRIBUTION SYSTEM AND METHOD

(75) Inventor: Hsiang-Jui Chung, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 409 days.

(21) Appl. No.: 12/755,404

(22) Filed: Apr. 6, 2010

(65) Prior Publication Data
US 2011/0158131 A1    Jun. 30, 2011

(30) Foreign Application Priority Data
Dec. 28, 2009    (CN) .......................... 2009 1 0312412

(51) Int. Cl.
*H04L 12/16* (2006.01)
*H04Q 11/00* (2006.01)
(52) U.S. Cl. ...................................................... 370/260
(58) Field of Classification Search .................. None
See application file for complete search history.

(56) References Cited

U.S. PATENT DOCUMENTS

| | | | | |
|---|---|---|---|---|
| 5,664,126 A | * | 9/1997 | Hirakawa et al. ............ 715/751 |
| 6,573,926 B1 | * | 6/2003 | Ichimura .................... 348/14.08 |
| 6,782,262 B1 | * | 8/2004 | Lundborg .................... 455/449 |
| 2004/0006697 A1 | * | 1/2004 | Noyama et al. .............. 713/182 |
| 2005/0010464 A1 | * | 1/2005 | Okuno et al. .................. 705/8 |
| 2005/0014490 A1 | * | 1/2005 | Desai et al. .................. 455/416 |
| 2005/0018686 A1 | * | 1/2005 | Igarashi et al. ............ 370/395.2 |
| 2008/0040276 A1 | * | 2/2008 | Hammad et al. ............. 705/44 |
| 2009/0020601 A1 | * | 1/2009 | Woodbury et al. ........... 235/375 |
| 2009/0067000 A1 | * | 3/2009 | Takiyama .................... 358/1.15 |
| 2009/0154439 A1 | * | 6/2009 | Igarashi et al. ............. 370/338 |
| 2010/0049579 A1 | * | 2/2010 | Suzuki ........................... 705/9 |
| 2010/0315483 A1 | * | 12/2010 | King ......................... 348/14.08 |

\* cited by examiner

*Primary Examiner* — Ayaz Sheikh
*Assistant Examiner* — Peter Chau
(74) *Attorney, Agent, or Firm* — Altis Law Group, Inc.

(57) ABSTRACT

A meeting information distribution system and method using a mobile communication base estimates a threshold value of a signal strength of a wireless signal receivable by a meeting room, and monitors user information of a terminal device by a server connected to the mobile communication base station. Attendee information is obtained from a database connected to the mobile communication base station, and is determined whether the user of the terminal device is an attendee by comparing the user information and the attendee information. Meeting information is obtained from the database if the user is an attendee, and is distributed to the terminal device through a wireless broadcast service channel.

16 Claims, 3 Drawing Sheets

MEETING INFORMATION DISTRIBUTION SYSTEM AND METHOD

BACKGROUND

1. Technical Field

Embodiments of the present disclosure relate generally to information management, and more particularly to a meeting information distribution system and method.

2. Description of Related Art

A wireless communication network may consist of a plurality of stations associated with terminal devices and in turn connected to a distribution system. In recent years, various business meetings and conferences are conducted regularly over wireless communication networks with meeting attendees in multiple locations. To enhance communication, in addition to meeting content, information sharing may be critical, such information possibly including meeting items, contact information, audio and video files, and decisions, for example. However, the distribution system may fail to properly organize and effectively distribute the information due to restrictions inherent in a particular implementation or technology.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
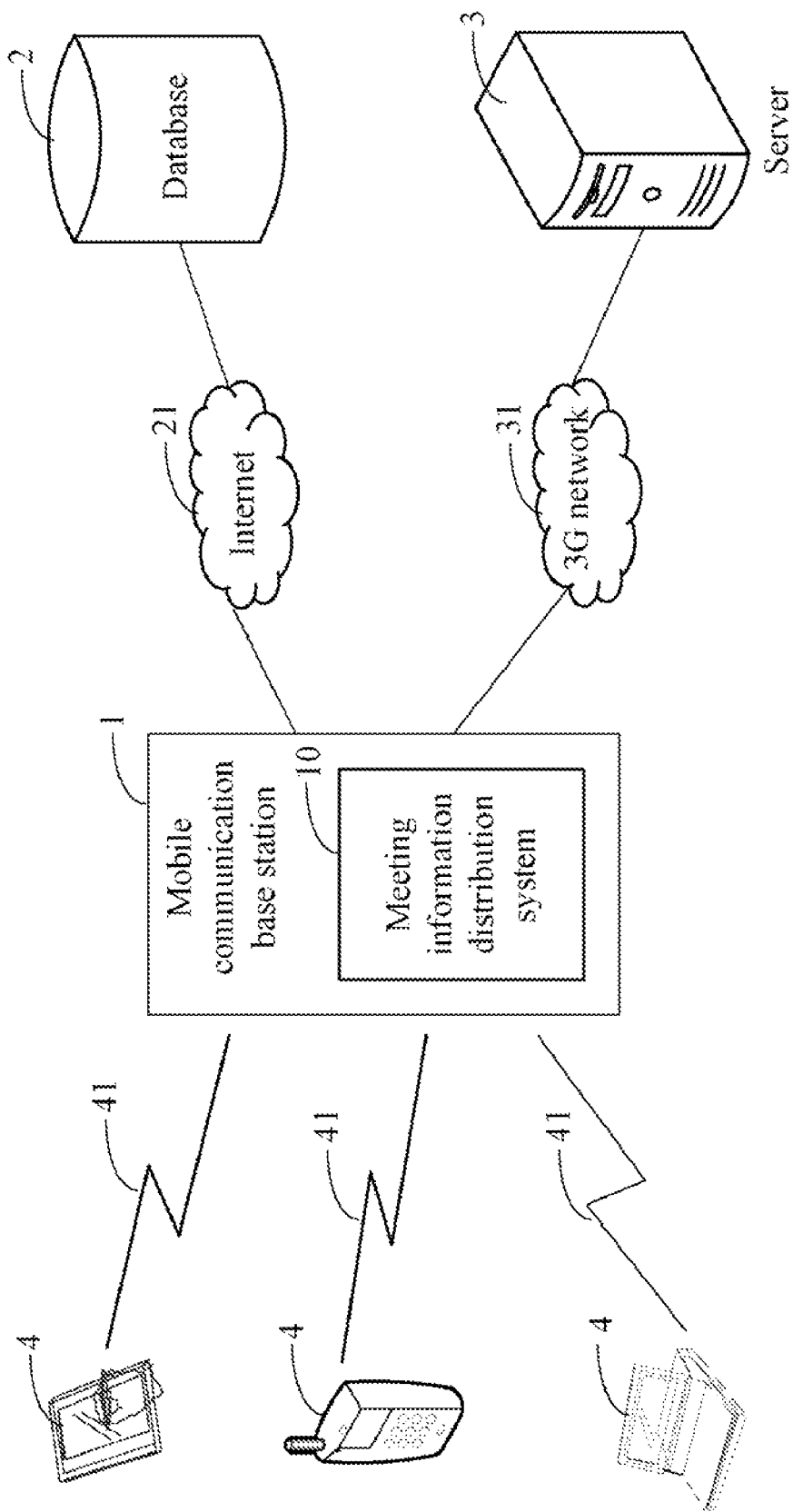
FIG. 1 is a schematic diagram of one embodiment of a meeting information distribution system.

FIG. 1 is a schematic diagram of one embodiment of a meeting information distribution system 10. In the embodiment, the system 10 is included in and implemented by a mobile communication base station 1, and includes a plurality of functional modules (see in FIG. 2). In one embodiment, the mobile communication base station 1 may be a Femto-cell, or a home communication workstation. The mobile communication base station 1 connects to a database through an Internet 21, connects to a server through a 3G network 31, such as a home location register (HLR) communication network or a visiting network location register (VLR) communication network. The mobile communication base station 1 may communicate with a plurality of terminal devices 4 through a wireless communication network 41. In one embodiment, the wireless communication network 41 may be a global system for mobile communications (GSM) network or a general packet radio service (GPRS) network.

The database 2 stores attendee information and meeting information. The attendee information may include participant rights, and contact information, such as phone numbers, of attendees of a meeting. The meeting information may include a start time, a meeting room location, and a meeting subject. The database server 3 monitors user information of each terminal device 4 through the wireless communication network 41, and sends the user information to the mobile communication base station 1 through the 3G network 31. The user information may be a phone number of the user, or a subscriber identity module (SIM) card number of the terminal device 4. Each of the terminal devices 4 receives the meeting information transmitted by the mobile communication base station 1. In one embodiment, each of the terminal devices 4 may be a mobile phone, a notebook, or a PDA (personal digital assistant) with a BLUETOOTH module.

Figure 2:
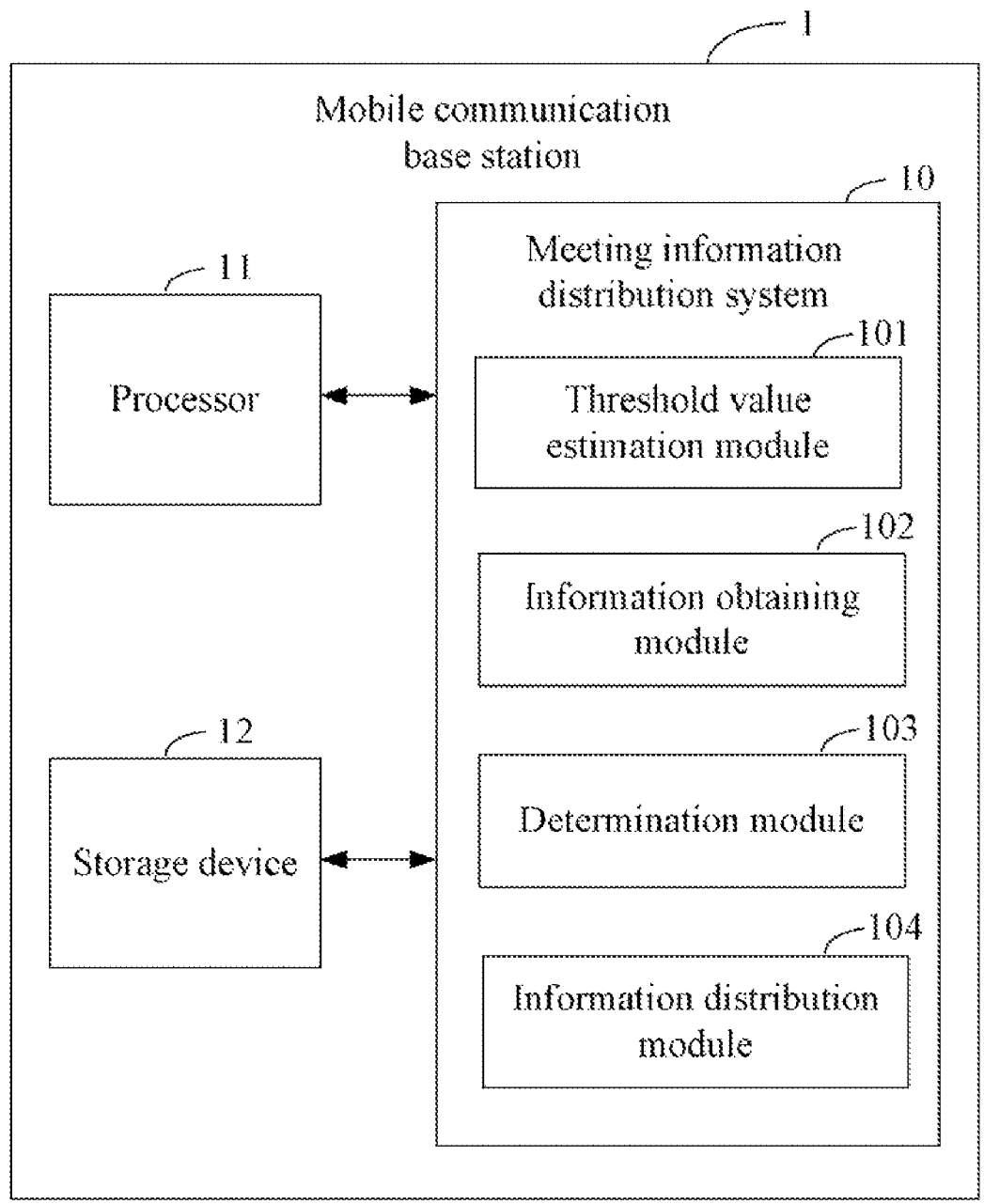
FIG. 2 is a schematic diagram of a mobile communication base station of FIG. 1.

FIG. 2 is a schematic diagram of the mobile communication base station 1 of the system 10 of FIG. 1. In the embodiment, the mobile communication base station 1 may include at least one processor 11 and a storage device 12. The at least one processor 11 executes one or more computerized codes of the meeting information distribution system 10 to distribute the meeting information to each of the terminal devices 4. The storage device 12 may be an internal storage device, such as a random access memory (RAM) for temporary storage of information and/or a read only memory (ROM) for permanent storage of information. The storage device 12 may also be an external storage device, such as a hard disk, a storage card, or a data storage medium. It should be apparent that FIG. 2 shows only one example of an architecture for the mobile communication base station 1 and may include more or fewer components than shown, or a different configuration of the various components in other embodiments.

In one embodiment, the meeting information distribution system 10 includes a threshold value estimation module 101, an information obtaining module 102, a determination module 103, and an information distribution module 104. One or more computerized codes of the function modules 101-104 may be stored in the storage device 12 and executed by the at least one processor 11. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The threshold value estimation module 101 is operable to estimate a threshold value of a signal strength of a wireless signal receivable by the meeting room, and store the threshold value in the storage device 12. In one embodiment, the threshold value may be −77.5-0 decibels per milliwatt (dBm). The threshold value may be measured as follows: the threshold value estimation module 101 measures a first signal strength of the wireless signal receivable by the meeting room when the door of the meeting room is closed. The first signal strength may be −70 dBm-0 dBm, for example. The threshold value estimation module 101 measures a second signal strength of the wireless signal receivable by the meeting room when the door of the meeting room is opened. The second signal strength may be −85 dBm-0 dBm, for example. The threshold value estimation module 101 calculates the threshold value according to the first signal strength and the second signal strength by a signal average algorithm, that is, the threshold value=(−70+(−85))/2=−77.5 dBm.

The information obtaining module 102 is operable to obtain the user information of each terminal device 4 monitored by the server 3 through the 3G network 31, and obtain the attendee information and the meeting information from the database 2 through the Internet 21. As mentioned above, the user information may be a phone number of the user, or a subscriber identity module (SIM) card number of the terminal device 4. The attendee information may include participant rights, and contact information, such as phone numbers, of the attendees. The meeting information may include a start time, a meeting room location, and a meeting subject.

The determination module 103 is operable to determine whether the user of each terminal device 4 is an attendee by comparing the user information and the attendee information. The determination module 103 is further operable to determine whether a signal strength of a transmitted signal from the terminal device 4 exceeds the threshold value, so as to determine whether the attendee has entered the meeting room. If the transmitted signal strength exceeds or equals the threshold value, the determination module 103 determines that the attendee has entered the meeting room. If the transmitted signal strength is less than the threshold value, the determination module 103 determines that the attendee has not entered the meeting room.

The determination module 103 is further operable to determine whether the attendee has left the meeting room by checking whether the signal strength of the transmitted signal from the terminal device 4 exceeds the threshold value. If the transmitted signal strength exceeds or equals the threshold value, the determination module 103 determines that the attendee has not left the meeting room. If the transmitted signal strength is less than the threshold value, the determination module 103 determines that the attendee has left the meeting room.

The information distribution module 104 is operable to distribute meeting information to each of the terminal devices 4 according to the phone number of the attendee through the wireless communication network 41, so that attendees can review the meeting information using the terminal devices 4. The information distribution module 104 is further operable to direct the mobile communication base station 1 to execute a common communication broadcast service when the meeting has ended.

Figure 3:
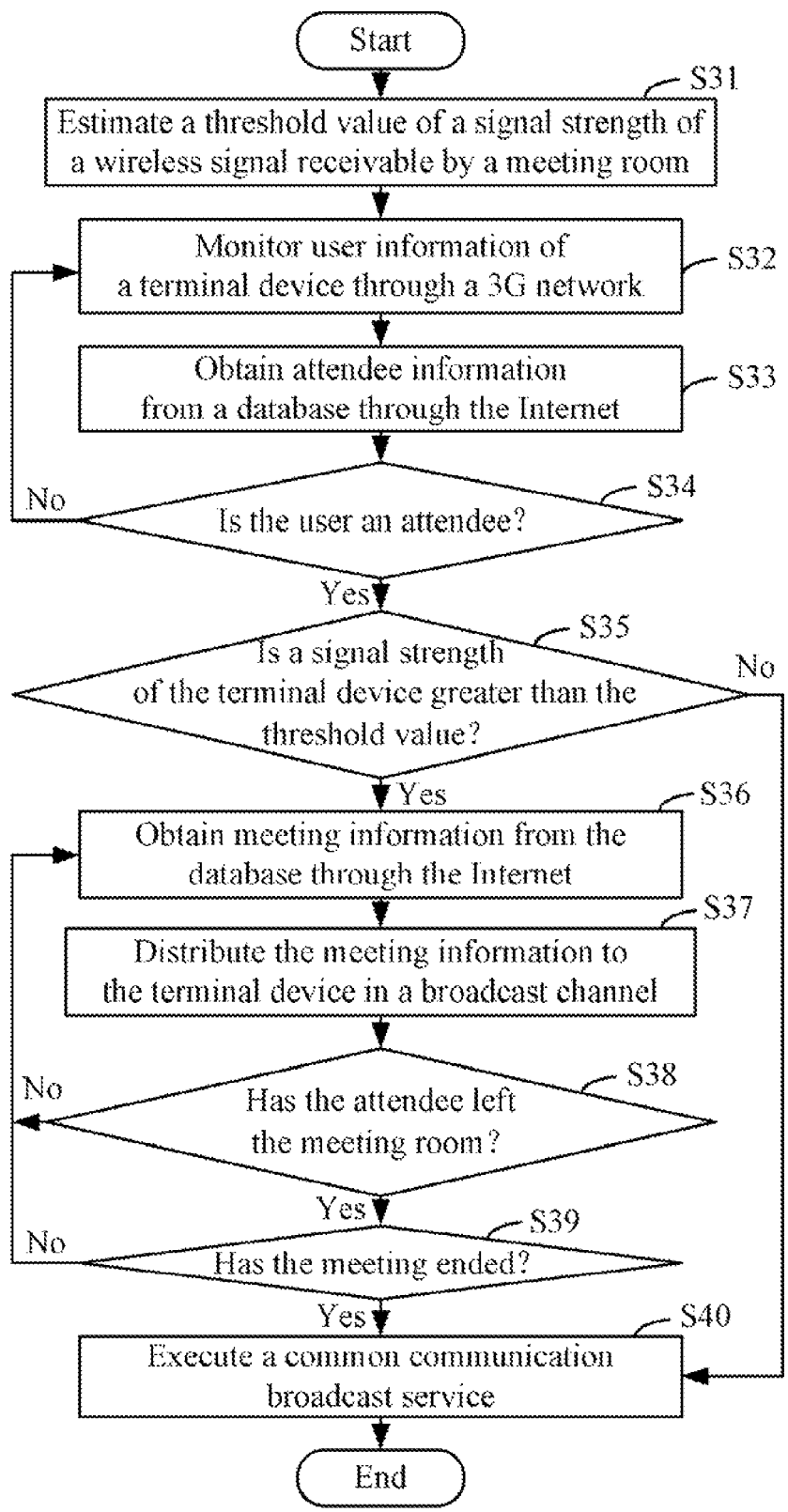
FIG. 3 is a flowchart of one embodiment of a method for distributing meeting information using a system, such as, for example, that of FIG. 1.

FIG. 3 is a flowchart of one embodiment of a method for distributing meeting information using a system such as, for example, that of FIG. 1. Depending on the embodiment, additional blocks may be added, others removed, and the ordering of the blocks may be changed.

In block S31, threshold value estimation module 101 estimates a threshold value of a signal strength of a wireless signal receivable by a meeting room, and stores the threshold value in the storage device 12. As mentioned above, the threshold value estimation module 101 calculates the threshold value according to a first signal strength and a second signal strength by a signal average algorithm.

In block S32, the information obtaining module 102 obtains user information of each terminal device 4 monitored by the server 3 through the 3G network 31. The user information may be a phone number of the user, or a subscriber identity module (SIM) card number of the terminal device 4. In block S33, the information obtaining module 102 obtains the attendee information from the database 2 through the Internet 21. The attendee information may include participant rights, and contact information, such as phone numbers, of the attendees.

In block S34, the determination module 103 determines whether the user of the terminal device 4 is an attendee by comparing the user information and the attendee information. If the user is not an attendee, block S32 is repeated. Otherwise, if the user is an attendee, in block S35, the determination module 103 determines whether a signal strength of a transmitted signal from the terminal device 4 exceeds the threshold value, so as to determine whether the attendee has entered the meeting room. If the transmitted signal strength exceeds or equals the threshold value, the determination module 103 determines that the attendee has entered the meeting room and the block S36 is implemented. If the transmitted signal strength is less than the threshold value, the determination module 103 determines that the attendee has not entered the meeting room and block S40 is implemented.

In block S36, the information obtaining module 102 obtains meeting information from the database 2 through the Internet 21. The meeting information may include a start time, a meeting room location, and a meeting subject. In block S37, the information distribution module 104 distributes the meeting information to each of the terminal devices 4 according to the phone number of the attendee through a broadcast service channel of the wireless communication network 41, so that the attendee can review the meeting information using the terminal devices 4.

In block S38, the determination module 103 determines whether the attendee has left the meeting room by checking whether the transmitted signal strength of the terminal device 4 of the attendee exceeds the threshold value. If the transmitted signal strength exceeds or equals the threshold value, the determination module 103 determines that the attendee has not left the meeting room and block S36 is repeated. If the transmitted signal strength is less than the threshold value, the determination module 103 determines that the attendee has left the meeting room and block S39 is implemented.

In block S39, the determination module 103 determines whether the meeting has ended. If the meeting has not ended, block S36 is implemented. Otherwise, if the meeting has ended, in block S40, the information distribution module 104 directs the mobile communication base station 1 to execute a common communication broadcast service.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A meeting information distribution system implemented by a mobile communication base station connected to a database and a server that monitors a plurality of terminal devices, the system comprising:

a threshold value estimation module operable to measure a first signal strength of a wireless signal in a meeting room when a door of the meeting room is closed, measure a second signal strength of the wireless signal when the door of the meeting room is opened, calculate a threshold value according to the first signal strength and the second signal strength, and store the threshold value in a storage device of the mobile communication base station;

an information obtaining module operable to obtain user information of each of the terminal devices monitored by the server, and obtain attendee information and meeting information from the database;

a determination module operable to determine whether a user of each of the terminal devices is an attendee of a meeting by comparing the user information and the attendee information, and determine whether a signal strength of a transmitted signal from each of the terminal devices exceeds the threshold value to determine whether the user has entered the meeting room; and an information distribution module operable to distribute the meeting information to each of the terminal devices through a wireless broadcast service channel when the user has entered the meeting room.

2. The system according to claim 1, wherein the determination module is further operable to determine whether the attendee has left the meeting room by checking whether the signal strength of the transmitted signal from each of the terminal devices exceeds the threshold value.

3. The system according to claim 1, wherein the information distribution module is further operable to direct the mobile communication base station to execute a common communication broadcast service when the meeting has ended.

4. The system according to claim 1, wherein the user information comprises a phone number and a Subscriber Identity Module (SIM) card number of each of the terminal devices.

5. The system according to claim 1, wherein the attendee information comprises participant rights and a phone number of the attendee.

6. The system according to claim 1, wherein the meeting information comprises a start time, a meeting room location, and a meeting subject.

7. A method for distributing meeting information using a mobile communication base station, the method comprising:
measuring a first signal strength of a wireless signal in a meeting room when a door of the meeting room is closed, measuring a second signal strength of the wireless signal when the door of the meeting room is opened, calculating a threshold value according to the first signal strength and the second signal strength, and storing the threshold value in a storage device of the mobile communication base station;
monitoring user information of a terminal device by a server connected to the mobile communication base station;
obtaining attendee information from a database connected to the mobile communication base station;
determining whether a user of the terminal device is an attendee of a meeting by comparing the user information and the attendee information;
determining whether a signal strength of a transmitted signal from the terminal device exceeds the threshold value to determine whether the user has entered the meeting room if the user of the terminal device is an attendee;
obtaining meeting information from the database if the user has entered the meeting room;
distributing the meeting information to the terminal device through a broadcast service channel of a wireless communication network.

8. The method according to claim 7, further comprising:
comparing the signal strength of the transmitted signal from the terminal device and the threshold value to determine whether the attendee has left the meeting room;
determining whether the meeting has ended if the attendee has left the meeting room; and
directing the mobile communication base station to execute a common communication broadcast service when the meeting has ended.

9. The method according to claim 7, wherein the user information comprises a phone number and a Subscriber Identity Module (SIM) card number of the terminal device.

10. The method according to claim 7, wherein the attendee information comprise participant rights and a phone number of the attendee.

11. The method according to claim 7, wherein the meeting information comprises a start time, a meeting room location, and a meeting subject.

12. A non-transitory storage medium having stored thereon instructions that, when executed by at least one processor of a mobile communication base station, cause the mobile communication base station to perform a method for distributing meeting information, the method comprising:
measuring a first signal strength of a wireless signal in a meeting room when a door of the meeting room is closed, measuring a second signal strength of the wireless signal when the door of the meeting room is opened, calculating a threshold value according to the first signal strength and the second signal strength, and storing the threshold value in a storage device of the mobile communication base station;
obtaining user information of a terminal device using a server connected to the mobile communication base station;
obtaining attendee information from a database connected to the mobile communication base station;
determining whether a user of the terminal device is an attendee of a meeting by comparing the user information and the attendee information;
determining whether a signal strength of a transmitted signal from the terminal device exceeds the threshold value to determine whether the user has entered the meeting room if the user of the terminal device is an attendee;
obtaining meeting information from the database if the user has entered the meeting room;
distributing the meeting information to the terminal device through a wireless broadcast service channel.

13. The non-transitory storage medium according to claim 12, wherein the method further comprises:
comparing the signal strength of the transmitted signal from the terminal device and the threshold value to determine whether the attendee has left the meeting room;
determining whether the meeting has ended if the attendee has left the meeting room; and
directing the mobile communication base station to execute a common communication broadcast service when the meeting has ended.

14. The non-transitory storage medium according to claim 12, wherein the user information comprises a phone number and a Subscriber Identity Module (SIM) card number of the terminal device.

15. The non-transitory storage medium according to claim 12, wherein the attendee information comprise participant rights and a phone number of the attendee.

16. The non-transitory storage medium according to claim 12, wherein the meeting information comprises a start time, a meeting room location, and a meeting subject.

* * * * *